United States Patent [19]

Osterhold et al.

[11] 4,358,155
[45] Nov. 9, 1982

[54] LIMITED SPRING AND INERTIA LATCH SYSTEM

[75] Inventors: Wolfgang Osterhold, Brighton, Mich.; Bernd A. Klueting, Radevormwald, Fed. Rep. of Germany

[73] Assignee: Keiper U.S.A., Inc., Mich.

[21] Appl. No.: 180,317

[22] Filed: Aug. 22, 1980

[51] Int. Cl.³ .............................................. B60N 1/02
[52] U.S. Cl. .................................... 297/379; 297/216
[58] Field of Search ........................ 297/379, 378, 216

[56] References Cited

U.S. PATENT DOCUMENTS

| 4,147,386 | 4/1979 | Stolper | 297/362 |
| 4,165,128 | 8/1979 | Strowick et al. | 297/367 |
| 4,294,488 | 10/1981 | Pickles | 297/367 |

Primary Examiner—William E. Lyddane

[57] ABSTRACT

An improved inertia latch system for a vehicle seat having a pivotally adjustable backrest and a separate more forwardly pivoted hinge member to accommodate forward tilting of the backrest for rear passenger entry and exit provides a limit for the seat angle at which release of the inertia latch can be effected in order to enhance safety, a manual override for releasing the inertia latch and a reduction in weight and cost of the inertia latch mechanism.

8 Claims, 2 Drawing Figures

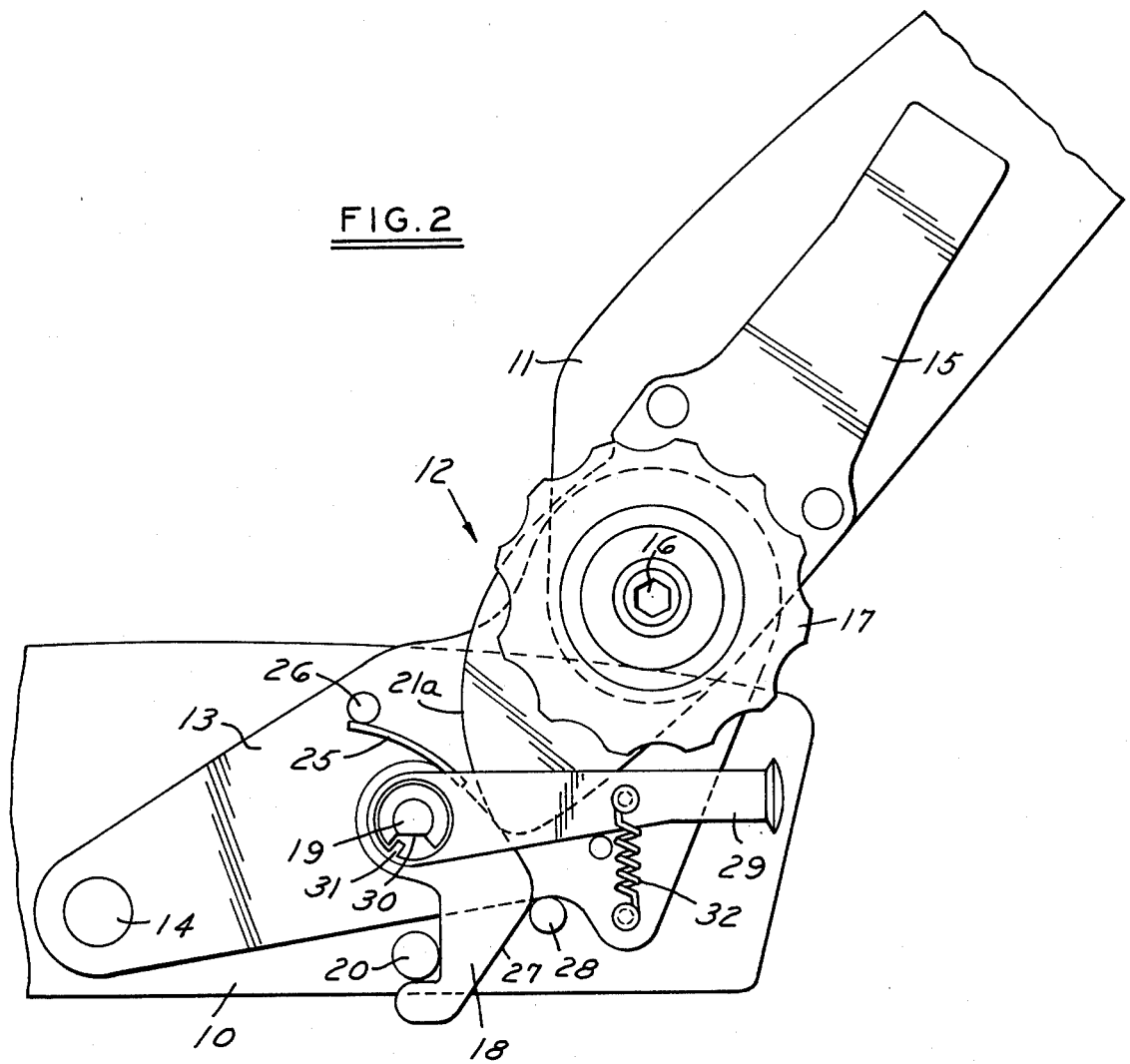

LIMITED SPRING AND INERTIA LATCH SYSTEM

BACKGROUND OF THE INVENTION

In co-pending U.S. application Ser. No. 129,831 filed Mar. 13, 1980, now U.S. Pat. No. 4,305,615, a Continuation-in-part of application Ser. No. 931,306 filed Mar. 7, 1978, now abandoned, a vehicle seat back mounting is disclosed having a pivotal connection with a bracket attached to the lower seat to accommodate forward tilting of the seat back for rear passenger entry and exit and a second adjustable pivot is provided to accommodate a reclined or otherwise adjusted back rest angle. An inertia latch is pivotally mounted on an intermediate bracket extending between the adjustment and forward tilting pivots with a recessed catch shaped for engaging a projection anchored on the stationary seat to prevent forward tilting. The center of gravity of the latch is located forwardly and below the pivot point so that during manual tilting of the seat back the force of gravity releases the latch from the projection and so that during sudden deceleration of the vehicle an inertial force counteracts the force of gravity and prevents unlatching.

Certain difficulties and limitations have been encountered with such inertial latch system which the present improved construction is directed to overcome. One problem arose when the seat back was tilted forward while in a reclined adjustment position due to lack of vehicle roof clearance for the extended length of the seat back when aligned with both adjustment and forward tilting pivots. Another problem arose when for any reason gravity failed to actuate the latch to permit forward tilting of the seat back with no convenient provision for manual release of the inertia latch. In addition, with the hook shaped catch of the depending inertia latch facing forward and the mass of the hook substantially rearward of the suspension pivot, a substantial mass of forwardly projecting extension of the inertia latch was required to provide a predominant counterbalancing center of gravity for the hook spaced horizontally sufficiently from the suspension pivot to provide effective gravity actuation to open the latch.

SUMMARY OF THE INVENTION

In order to overcome the problems and limitations encountered with the construction of said pending application as well as reduce the weight and cost of the inertia latch mechanism provision has been made to block the release action of the inertia latch whenever the seat back is adjusted to a reclining position providing inadequate clearance for forward tilting without encountering inference of the vehicle roof. Provision for convenient manual override release has been made and a light spring substituted for the mass of gravity actuated forward extension of the inertia latch member.

BRIEF DESCRIPTION OF THE DRAWINGS

FIG. 2 is a side elevation of a modified inertia latch construction similar to that of FIG. 1.

DETAILED DESCRIPTION OF THE PREFERRED EMBODIMENTS

Figure 1:
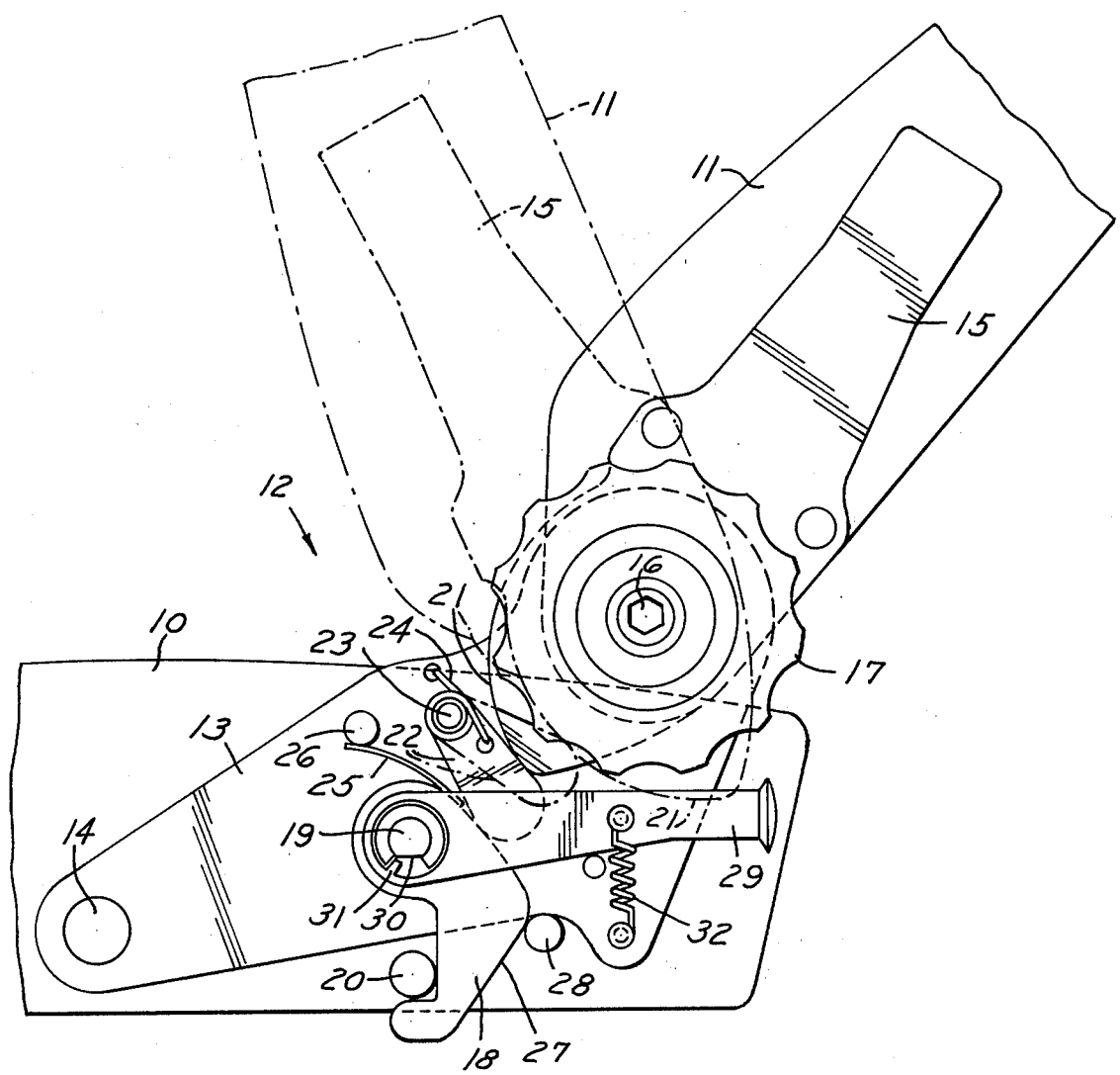
FIG. 1 is a side elevation of an inertia latch construction similar to that of said prior patent application with added provisions.

Referring to FIG. 1, lower seat 10 and seat back 11 are provided with a pair of inertia latch hinge fittings 12 each having lower bracket 13 pivotally attached at 14 to lower seat 10 and upper bracket 15 suitably secured to seat back 11 and pivotally connected at 16 to seat bracket 13 in an adjustable manner controlled by rotation of hand wheel 17. Such adjustment is fully described for a "taumel" seat back adjuster in said prior application which per se is known in the art and therefore not disclosed in detail herein.

Inertia latch hook element 18 pivotally attached at 19 to lower bracket 13 is normally positioned as shown ready to engage fixed projection 20 secured to lower seat 10. Upon sudden deceleration of the vehicle, hook element 18 is inertially retained in a latch engaging position to prevent forward tilting of the bracket 13 and seat back 11 for any position of adjustment.

In the reclined position of the seat back adjustment as shown, extension cam 21 of bracket 15 acting through link 22 pivotally connected at 23 to bracket 13 prevents any opening of latch element 18 upon initial forward tilting of the seat back about pivot 14. Such blocking action is provided for the reclined position shown where, upon forward tilting, the top of the seat back would hit the roof of the car due to the extended effective length when the seat back is in substantial alignment with pivots 14 and 16. When the seat back is adjusted to a normal more erect position, cam 21 will swing to a position releasing link 22 from its engagement with hook element 18 and retraction of link 22 will be effected by coiled pivot mounted spring 24.

With the seat back in such more erect position which will clear the vehicle roof when tilted forward, initial manual tilting of the seat back while the vehicle is stationary will permit leaf spring 25, secured to the back of element 18 and reacting in its tensioned curved state against stop 26 on bracket 13, to rotate latch element 18 in a counterclockwise direction as the pivotal movement of hinge member 13 about pivotal axis 14 permits cam surface 27 at the back of element 18 to move relative to fixed stop 28 which serves both as a limit stop for hinge bracket 13 and as a cam engaging element for moving the latch hook into latch engagement orientation as the seat back returns to normal position and for permitting latch disengagement as the seat back is tilted forward for passenger entry or exit.

Leaf spring 25, which is straight in relaxed condition, has only a light tension value sufficient to move inertia element 18 in a counterclockwise unlatching direction when the seat is tilted forward equivalent to the gravity actuation of a similar latch element as shown in said prior application which requires a substantially heavier counterbalancing portion of the inertia element forward of its pivotal mounting. Accordingly, the light tension of leaf spring 25 is overcome by inertia acting on the center of gravity of element 18 to produce a clockwise moment in response to sudden deceleration.

Manual release handle 29 pivotally mounted at 19 on the same axis as inertia element 18 has a slotted projection 30 engageable with lug 31 on inertia element 18 which, upon manual actuation overcoming return spring 32, provides for manual release actuation of inertia element 18 upon initial forward tilting of the seat back in the event leaf spring 25 for any reason is inoperative to effect such latch release. For normal operation slotted opening 30 provides sufficient lost motion for inertia latch opening responsive to leaf spring 25 without displacement of manual handle 29.

With reference to the FIG. 2 modification cam surface 21a is extended for a sufficient length to directly engage the back of inertia element 18 without the need for an intermediate link such as 22 in FIG. 1. While the apparent simplicity of eliminating the intermediate link suggests this is to be the preferred embodiment, the extra material and weight involved in the extension of a relatively heavy bracket member compared to a relatively light plastic or equivalent intermediate link provide compensating equivalent considerations equally effective to block the release action of a gravity actuated inertia latch, such as disclosed in said prior application, or the relatively lighter spring actuated inertia element of the present disclosure.

We claim:

1. A hinge fitting for a vehicle having a forward tiltable back rest comprising a first hinge member pivotally attachable to a lower seat member for accommodating forward back rest tilting, a second hinge member attachable to a back rest member and pivotally attached to said first hinge member in substantially spaced relation to said first hinge member's seat pivotal connection with adjustable means to accommodate back rest adjustment to a reclined or otherwise adjusted position, means for limiting backward pivoting of said first hinge member at the occupant's seated position, inertia responsive latch means for preventing forward pivoting of said first hinge member upon sudden vehicle deceleration, means for releasing said latch means responsive to initial forward pivoting of said first hinge member in the absence of sudden vehicle deceleration, and means for restricting latch release action of said last means to a limited operating range of back rest adjustment excluding extremities of adjustment where the back rest approaches alignment with said forward back rest tilting and adjustment pivotal connections.

2. A hinge fitting for a vehicle as set forth in claim 1 wherein said inertia responsive latch means includes a depending element pivotally connected to said first hinge member having a forward facing hook and a projection having a fixed relation to the lower seat member engageable by said hook, and wherein said means for restricting latch release action comprises a projection extending from said second hinge member blocking the release movement of said inertia responsive latch means for a predetermined range of adjustment of said second hinge member relative to said first hinge member.

3. A hinge fitting for a vehicle as set forth in claim 1 wherein said inertia responsive latch means includes a depending element pivotally connected to said first hinge member having a forward facing hook and a projection having a fixed relation to the lower seat member engageable by said hook, and wherein said means for restricting latch release action comprises a projection extending from said second hinge member for blocking the release movement of said inertia responsive latch means for a predetermined range of adjustment of said second hinge member relative to said first hinge member, and wherein a supplemental pivoted link is interposed between said extension and said inertia responsive latch means.

4. A hinge fitting as set forth in claim 2 or 3 including spring means to bias said depending element toward a release position, and means responsive to said pivoting of said first hinge member to said occupant seated position for overcoming said spring biasing while moving said depending element to a latch engaging orientation.

5. A hinge fitting as set forth in claim 4 wherein said spring means comprises a leaf spring secured to said depending element with means for reacting against said first hinge member.

6. A hinge fitting as set forth in claim 2 or 3 including spring means to bias said depending element toward a release position, and means responsive to said pivoting of said first hinge member to said occupant seated position for overcoming said spring biasing while moving said depending element to a latch engaging orientation, said last means comprising said means for limiting backward pivoting of said first hinge member engaging a cam surface at the back of said depending element.

7. A hinge fitting as set forth in any of claims 1, 2 or 3 including supplemental manual means for releasing said latch means.

8. A hinge fitting as set forth in claim 7 wherein said inertia responsive latch means comprises a depending hook element pivotedly connected to said first hinge member and a projection secured to said lower seat member engageable by said hook element, and wherein said supplemental manual means comprises a hand lever having a common pivotal connection with said inertia latch means, and a lost motion connection between said hand lever and said depending element normally accommodating opening movement of said forward facing hook away from said projection.

* * * * *